United States Patent
Bang et al.

(10) Patent No.: US 11,465,384 B2
(45) Date of Patent: Oct. 11, 2022

(54) OUTER CASE FOR FLEXIBLE RECHARGEABLE BATTERY AND FLEXIBLE RECHARGEABLE BATTERY INCLUDING SAME

(71) Applicant: Samsung SDI Co., Ltd., Yongin-si (KR)

(72) Inventors: Wonkyu Bang, Yongin-si (KR); Junwon Suh, Yongin-si (KR); Juhee Sohn, Yongin-si (KR); Jungyup Yang, Yongin-si (KR); Hyeri Eom, Yongin-si (KR); Jeongdoo Yi, Yongin-si (KR); Da-Un Han, Yongin-si (KR); Juhyeong Han, Yongin-si (KR); Seokhun Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 149 days.

(21) Appl. No.: 16/624,851

(22) PCT Filed: May 8, 2018

(86) PCT No.: PCT/KR2018/005249
§ 371 (c)(1),
(2) Date: Dec. 19, 2019

(87) PCT Pub. No.: WO2019/009512
PCT Pub. Date: Jan. 10, 2019

(65) Prior Publication Data
US 2021/0328289 A1    Oct. 21, 2021

(30) Foreign Application Priority Data
Jul. 4, 2017    (KR) .......................... 10-2017-0084889

(51) Int. Cl.
*B32B 3/26*    (2006.01)
*B32B 27/08*    (2006.01)

(52) U.S. Cl.
CPC .............. *B32B 3/263* (2013.01); *B32B 27/08* (2013.01); *B32B 2250/04* (2013.01); *B32B 2307/7246* (2013.01); *B32B 2307/734* (2013.01)

(58) Field of Classification Search
CPC ..... B32B 3/263; B32B 27/08; B32B 2250/04; B32B 2307/7246; B32B 2307/734
(Continued)

(56) References Cited

U.S. PATENT DOCUMENTS

2007/0281208 A1    12/2007    Yoon et al.
2013/0101884 A1    4/2013    Ueda
(Continued)

FOREIGN PATENT DOCUMENTS

JP    5753258 B2    7/2015
KR    10-0905393 B1    6/2009
(Continued)

*Primary Examiner* — Betelhem Shewareged
(74) *Attorney, Agent, or Firm* — Lewis Roca Rothgerber Christie LLP

(57) ABSTRACT

The present disclosure relates to an outer case for a flexible rechargeable battery, including a first resin layer configured to include a first patterned area, a moisture barrier layer disposed on the first resin layer to include a second patterned area, a second resin layer disposed on the moisture barrier layer to include a third patterned area, and a stress relaxation layer configured to cover the third patterned area.

27 Claims, 10 Drawing Sheets

(58) Field of Classification Search
USPC .......................................................... 428/213
See application file for complete search history.

(56) References Cited

U.S. PATENT DOCUMENTS

| | | | |
|---|---|---|---|
| 2015/0349375 A1 | | 12/2015 | Takahashi et al. |
| 2016/0013459 A1 | | 1/2016 | Suh et al. |
| 2021/0328289 A1* | | 10/2021 | Bang ................ H01M 10/0431 |

FOREIGN PATENT DOCUMENTS

| | | | | | |
|---|---|---|---|---|---|
| KR | 10-2014-0043535 A | | 4/2014 | | |
| KR | 10-2015-0050081 A | | 5/2015 | | |
| KR | 10-2016-0001909 A | | 1/2016 | | |
| KR | 10-2016-0008361 A | | 1/2016 | | |
| KR | 10-2016-0048696 A | | 5/2016 | | |
| KR | 10-2016-0090108 A | | 7/2016 | | |
| KR | 20160090108 A | * | 7/2016 | ........ | H01M 10/0583 |
| KR | 10-2017-0015890 A | | 2/2017 | | |
| KR | 10-1743639 B1 | | 6/2017 | | |
| WO | WO 2012/140709 A1 | | 10/2012 | | |

* cited by examiner

US 11,465,384 B2

OUTER CASE FOR FLEXIBLE RECHARGEABLE BATTERY AND FLEXIBLE RECHARGEABLE BATTERY INCLUDING SAME

CROSS-REFERENCE TO RELATED APPLICATION(S)

This application is a National Phase Patent Application of International Patent Application Number PCT/KR2018/005249, filed on May 8, 2018, which claims priority of Korean Patent Application No. 10-2017-0084889, filed Jul. 4, 2017. The entire contents of both of which are incorporated herein by reference.

TECHNICAL FIELD

The present disclosure relates to an outer case for a flexible rechargeable battery and a flexible rechargeable battery including the same.

BACKGROUND ART

Recently, attention has been focused on the development and commercialization of flexible electronic devices such as flexible displays, wearable mobile phones, and watches. Therefore, there is an increasing demand for a flexible characteristic implementation for a rechargeable battery that is a power supply device for such flexible electronic devices.

In general, a rechargeable battery is formed to include an electrode assembly including a positive electrode, a negative electrode, and a separator interposed therebetween and an outer case accommodating the electrode assembly.

Such an external case has been applied in various forms, and in particular, a pouch type of case which can implement a bending characteristic relatively easily is applied as an outer case for a flexible rechargeable battery.

DISCLOSURE

An exemplary embodiment of the present disclosure has been made in an effort to provide an outer case for a flexible rechargeable battery with improved flexibility.

Another exemplary embodiment of the present disclosure has been made in an effort to provide a flexible rechargeable battery having an excellent bending characteristic by applying the outer case for a flexible rechargeable battery according to examples.

One aspect of the present disclosure provides an outer case for a flexible rechargeable battery, including a first resin layer configured to include a first patterned area, a moisture barrier layer disposed on the first resin layer to include a second patterned area, a second resin layer disposed on the moisture barrier layer to include a third patterned area, and a stress relaxation layer configured to cover the third patterned area.

Another aspect of the present disclosure provides an outer case for a flexible rechargeable battery, including a first resin layer configured to include a patterned area, a moisture barrier layer disposed on the first resin layer to include a patterned area, and a stress relaxation layer configured to cover the patterned area of the moisture barrier layer.

Another aspect of the present disclosure provides a flexible rechargeable battery, including an electrode assembly in which a stack including a positive electrode, a negative electrode, and a separator interposed therebetweeen is spiral-wound in a direction, a first outer case configured to accommodate the electrode assembly therein, and a second outer case disposed to face the first outer case and to accommodate the electrode assembly, wherein the first outer case is the outer case for a flexible rechargeable battery described in the exemplary embodiments of the present disclosure.

According to the exemplary embodiments, flexibility may be improved by uniformly distributing the stress applied to the outer case for a flexible rechargeable battery.

In addition, the flexible rechargeable battery according to the exemplary embodiment of the present disclosure has an advantage of maintaining excellent durability and battery performance even after repeated bending.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

Further, since sizes and thicknesses of constituent elements shown in the accompanying drawings are arbitrarily given for better understanding and ease of description, the present invention is not limited to the illustrated sizes and thicknesses.

In addition, unless explicitly described to the contrary, the word "comprise" and variations such as "comprises" or "comprising" will be understood to imply the inclusion of stated elements but not the exclusion of any other elements.

Figure 1:
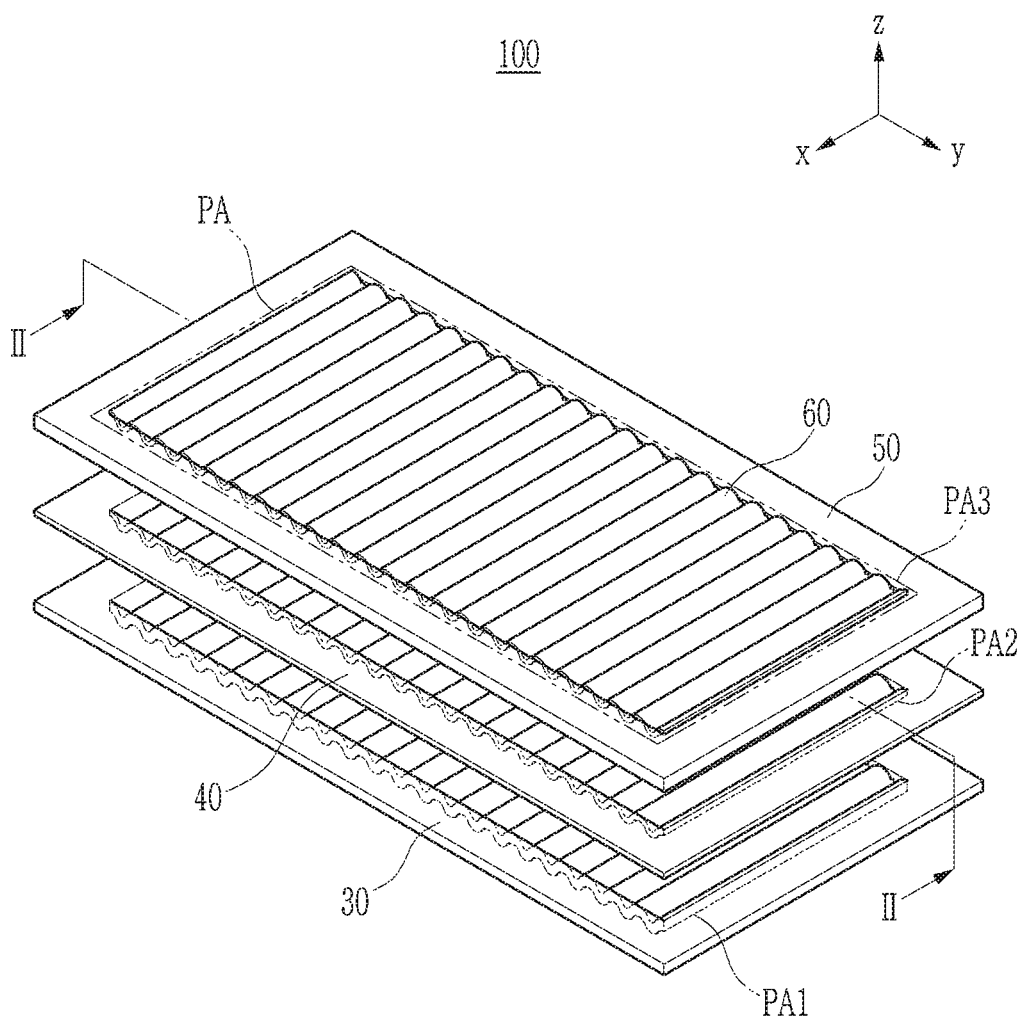
FIG. 1 illustrates a perspective view of an outer case for a flexible rechargeable battery according to an exemplary embodiment of the present disclosure.
Figure 2:
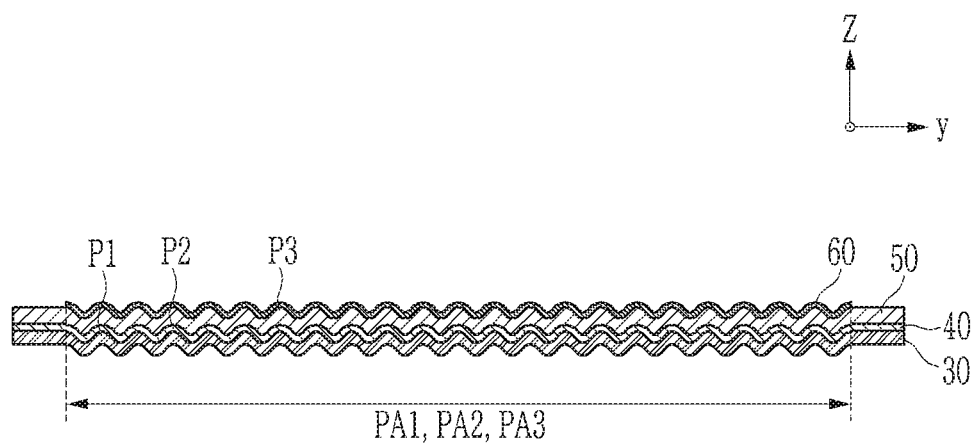
FIG. 2 illustrates a cross-sectional view taken along a line II-II of FIG. 1.

FIG. 1 illustrates a perspective view of an outer case for a flexible rechargeable battery according to an exemplary embodiment of the present disclosure, and FIG. 2 illustrates a cross-sectional view taken along a line II-II of FIG. 1.

First, referring to FIG. 1, an outer case 100 for a flexible rechargeable battery according to an exemplary embodiment of the present disclosure includes a first resin layer 30, a moisture barrier layer 40, and a second resin layer 50.

The first resin layer 30 serves to protect an electrode assembly and facilitates adhesion between outer cases, and includes a first patterned area PA1.

The first patterned area PA1 includes a plurality of patterns P1 disposed along a direction. The patterns P1 may be disposed along a longitudinal direction (y-axis direction) of the outer case for a flexible rechargeable battery as illustrated in FIG. 2, or may be disposed along a width direction (x-axis direction of FIG. 1) of the outer case although not illustrated.

The patterns P1 may include recess portions and convex portions. In this case, the recess portions and the convex portions may be disposed in parallel with each other. In addition, vertical cross-sections (yz planes) of the patterns P1 may have one or more of a triangular shape, a rectangular shape, a polygonal shape, a semicircular shape, a semi-elliptical shape, a wave shape, and a mixture thereof. FIG. 2 exemplarily illustrates a case in which the vertical cross-sections of the plurality of patterns P1 are wavy among the examples. That is, the concave portions and the convex portions may be formed to form a wave shape, thereby forming the plurality of patterns P1.

The first resin layer 30 may be formed of, e.g., a polyolefin or a copolymer of a polyolefin, and specifically, the polyolefin may be polyethylene (PE) or polypropylene (PP), but the present invention is not limited thereto.

An average thickness of the first resin layer 30 may be in a range of 10 μm to 100 μm, or specifically 20 μm to 50 μm. When the average thickness of the first resin layer 30 satisfies the numerical range, moldability, adhesion, and chemical resistance are excellent.

The moisture barrier layer 40 functions as a barrier layer that can prevent the electrolyte from leaking or moisture from penetrating. The moisture barrier layer 40 is disposed on the first resin layer 30 to include a second patterned area PA2.

The second patterned area PA2 is formed to correspond to the first patterned area PA1. That is, the second patterned area PA2 includes a plurality of patterns P2 formed to correspond to the plurality of patterns P1 formed in the first patterned area PA1. A detailed description of the second patterned area PA2 and the plurality of patterns P2 is the same as that described in the first patterned area PA1, and thus the description thereof will be omitted.

An average thickness of the moisture barrier layer 40 may be in a range of, e.g., 10 μm to 100 μm, and specifically, 10 μm to 50 μm or 10 μm to 30 μm. When the average thickness of the moisture barrier layer 40 satisfies the above range, it is excellent in workability and may effectively prevent leakage of an electrolyte solution or penetration of moisture from the outside.

The second resin layer 50 is disposed on the moisture barrier layer 40.

The second resin layer 50 functions as a protective layer to protect the electrode assembly from an external environment, and includes a third patterned area PA3.

The third patterned area PA3 is formed to correspond to the second patterned area PA2. That is, the third patterned area PA3 includes a plurality of pattern P3 formed to correspond to the plurality of patterns P2 formed in the second patterned area PA2. A detailed description of the third patterned area PA3 and the plurality of patterns P3 is the same as that described in the first patterned area PA1, and thus the description thereof will be omitted.

As a result, each of the patterns P1, P2, and P3 included in the first to third patterned areas PA1, PA2, and PA3 may have a same shape, and may be formed to correspond to each other.

The second resin layer 50 may be formed of at least one of, e.g., polyethylene terephthalate, polybutylene terephthalate, polyethylene naphthalate, polybutylene naphthalate, copolyester, polycarbonate, and nylon film, but the present invention is not limited thereto.

An average thickness of the second resin layer 50 may be in a range of, e.g., 10 μm to 100 μm, or specifically 10 μm to 50 μm. In the case where the average thickness of the second resin layer 50 is 10 μm or more, physical properties are excellent, and therefore it is not easily damaged, and when the average thickness of the second resin layer 50 is 100 μm or less, moldability such as injection or foaming is excellent. In addition, when the thickness range is satisfied, an excellent battery capacity per unit volume may be ensured when the outer case according to the present exemplary embodiment is applied to a flexible rechargeable battery.

In the present disclosure, the first patterned area PA1, the second patterned area PA2, and the third patterned area PA3 may be simultaneously formed. That is, the patterns P1, P2, and P3 may be included by using, e.g., insert molding, in a state where the first resin layer 30, the moisture barrier layer 40, and the second resin layer 50 are stacked.

The first resin layer 30, the moisture barrier layer 40, and the second resin layer 50 respectively include first to third patterned areas PA1, PA2, and PA3 including the patterns P1, P2, and P3, and thus the outer case for a flexible rechargeable battery according to the present disclosure is very excellent in flexibility. This is because the patterns P1, P2, and P3 included in each of the first to third patterned areas PA1, PA2, and PA3 may appropriately disperse stresses generated by bending or folding the outer case 100.

The outer case 100 for a flexible rechargeable battery of the present disclosure is characterized in including a stress relaxation layer 60 covering the third patterned area PA3.

The stress relaxation layer 60 may include a material having a predetermined elastic force, e.g., a silicon-based resin or a urethane-based resin.

The stress relaxation layer 60 may be formed to have a same vertical cross-sectional shape as the patterns P3 formed in the third patterned area PA3.

Specifically, the patterns PA1, PA2, and PA3 formed in the first to third patterned areas PA1, PA2, and PA3 may be formed to have the same shape as each other, and the stress relaxation layer 60 covering the third patterned area PA3 may also have the same cross-sectional shape as the patterns PA1, PA2, and PA3. That is, as illustrated in FIG. 2, when the patterns the PA1, PA2, and PA3 are formed to have a wavy cross-section, the stress relaxation layer 60 may be formed with a constant thickness to have a wavy cross-section.

As illustrated in FIG. 2, only a region corresponding to the third patterned area PA3 may be formed for the stress relaxation layer 60. Alternatively, although not illustrated, the stress relaxation layer 60 may be formed to cover the third patterned area PA3 and an entire surface of the second resin layer 50 including areas other than the third patterned area PA3.

Even when the stress relaxation layer 60 is disposed only in an area corresponding to the third patterned area PA3, the bending characteristic of the outer case 100 may be sufficiently improved. Therefore, in this case, since the production cost can be reduced, the productivity can be improved.

An average thickness of the stress relaxation layer 60 may be in a range of 1 µm to 30 µm, and specifically 1 µm to 20 µm or 1 µm to 10 µm. In the case where the average thickness of the stress relaxation layer 60 satisfies the above numerical range, even when the outer case 100 is repeatedly bent, stress distribution is properly performed, and thus the outer case 100 may be prevented from being damaged even when it is repeatedly bent over thousands to tens of thousands of times.

Figure 3:
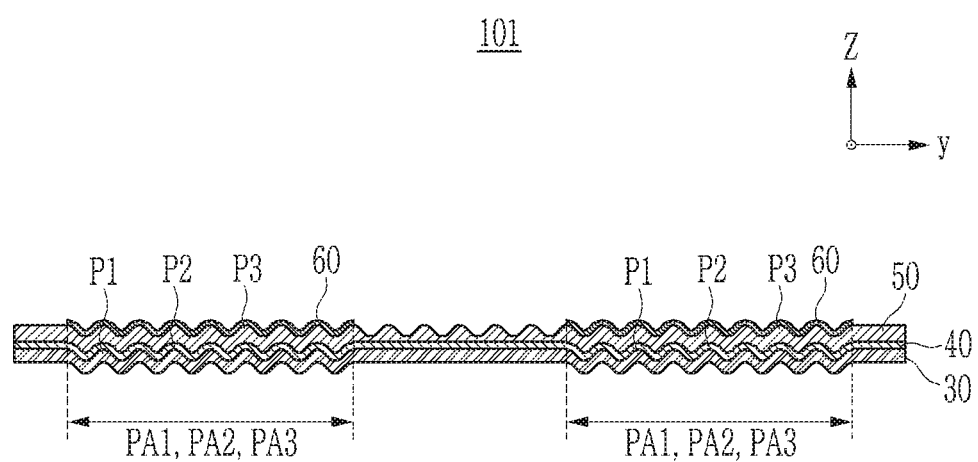
FIG. 3 to FIG. 5 each illustrates a perspective view of an outer case for a flexible rechargeable battery according to another exemplary embodiment of the present disclosure.

FIG. 3 illustrates a cross-sectional view of an outer case 101 for a flexible rechargeable battery according to another exemplary embodiment of the present disclosure. In describing the outer case 101 for the flexible rechargeable battery according to the present exemplary embodiment, a detailed description of the same configuration as that of the outer case 100 according to FIG. 1 and FIG. 2 will be omitted.

Referring to FIG. 3, the first resin layer 30 includes a plurality of first patterned areas PA1, the moisture barrier layer 40 includes a plurality of second patterned areas PA2, and the second resin layer 50 may include a plurality of third patterned areas PA3. That is, the first to third patterned areas PA1, PA2, and PA3 including the patterns P1, P2, and P3 may be disposed at a predetermined interval. Even in this case, the outer case 101 having an excellent bending characteristic may be implemented.

Therefore, if necessary, each of the first to third patterned areas PA1, PA2, and PA3 may be formed only in portions of the first resin layer 30, the moisture barrier layer 40, and the second resin layer 50. In this case, as illustrated in FIG. 3, the stress relaxation layer 60 may be formed only in an area corresponding to the third patterned area PA3, or, although not illustrated, the stress relaxation layer 60 may be formed to cover the entire surface of the second resin layer 50 including the third patterned area PA3 and areas other than the third patterned area PA3.

Figure 4:
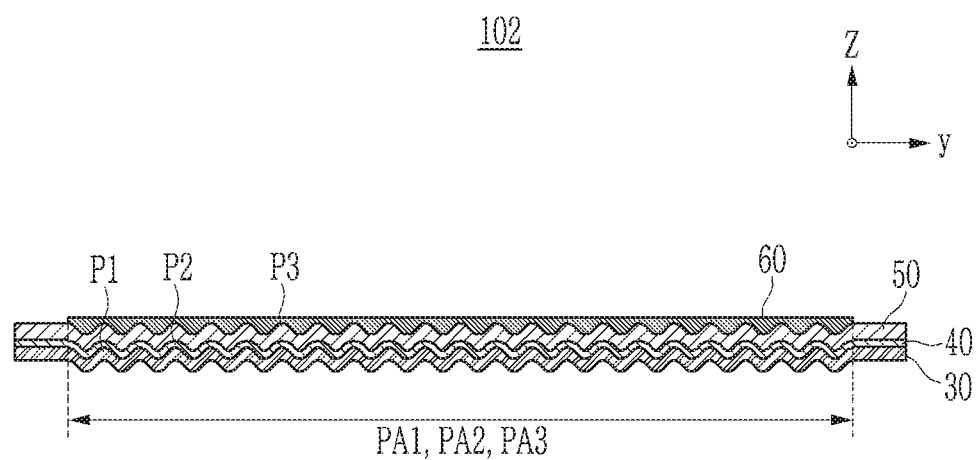

FIG. 4 illustrates a cross-sectional view of an outer case 102 for a flexible rechargeable battery according to another exemplary embodiment of the present disclosure. In describing the outer case 102 for the flexible rechargeable battery according to the present exemplary embodiment, a detailed description of the same configuration as that of the outer case 100 according to FIG. 1 and FIG. 2 will be omitted.

Referring to FIG. 4, one of a plurality of surfaces of the stress relaxation layer 60 covering the third patterned area PA3, which faces a surface thereof that contacts the third patterned area PA3, may be formed to be a flat surface. That is, a portion where the stress relaxation layer 60 is in contact with the second resin layer 50 has the same cross-sectional shape as the plurality of patterns P3 formed in the third patterned area PA3, but a portion that is not in contact with the second resin layer 50 may be formed to have a flat surface.

When the outer case 102 according to the present exemplary embodiment is applied to the flexible rechargeable battery, an assembly characteristic with the electrode assembly may be improved, and it may have an excellent bending characteristic.

Figure 5:
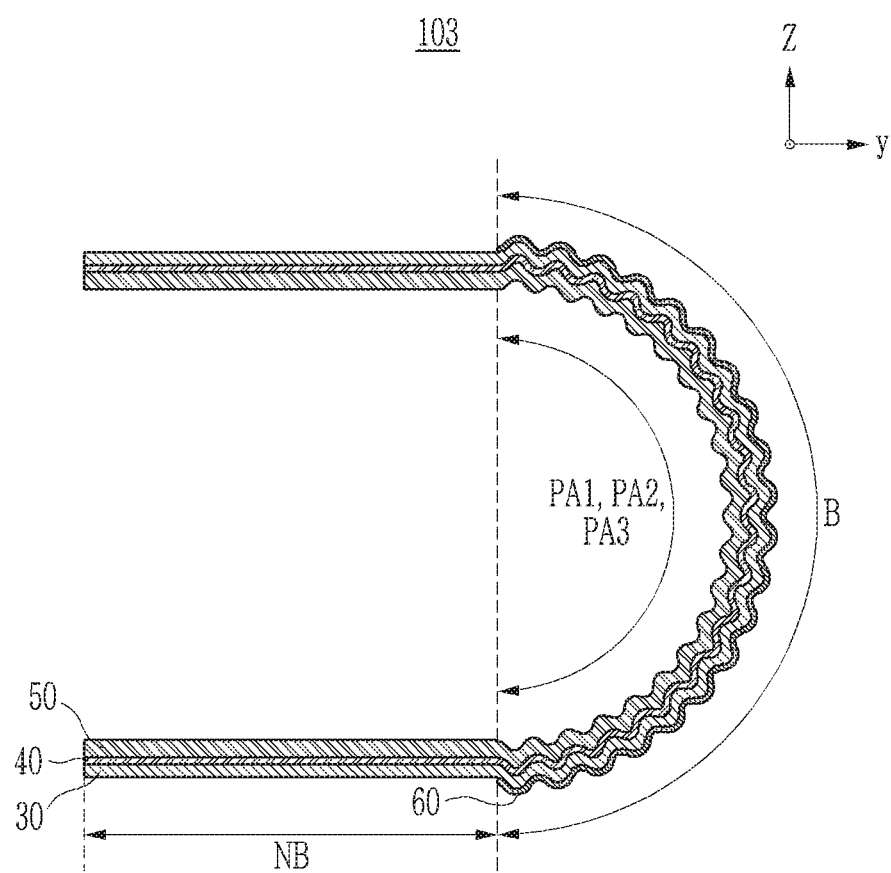

FIG. 5 illustrates a cross-sectional view of an outer case 103 for a flexible rechargeable battery according to another exemplary embodiment of the present disclosure. In describing the outer case 103 for the flexible rechargeable battery according to the present exemplary embodiment, a detailed description of the same configuration as that of the outer case 100 according to FIG. 1 and FIG. 2 will be omitted.

Referring to FIG. 5, the outer case 103 according to the present exemplary embodiment may be a flexible outer case 103. Accordingly, the outer case 103 according to the present exemplary embodiment may include a bending area B and a non-bending area NB.

As illustrated in FIG. 5, the bending area B indicates an area that is bent when the outer case 103 is bent or folded, and the non-bending area NB indicates an area that is not bent when the outer case 103 is bent or folded.

In the present exemplary embodiment, the first to third patterned areas PA1, PA2, and PA3 including the patterns P1, P2, and P3 may be disposed to correspond to the bending area B. That is, the first to third patterned areas PA1, PA2, and PA3 may not be included in most areas of the outer case as illustrated in FIG. 1 and FIG. 2, but may be formed only in some areas where the outer case is bent.

In this case, one direction in which the patterns PA1, PA2, and PA3 are positioned may be a same direction as a direction in which the outer case 103 is bent. In addition, the bending direction of the outer case 103 may be a longitudinal direction (y-axis direction) of the outer case 103.

In the present exemplary embodiment, the first to third patterned areas PA1, PA2, and PA3 and the stress relaxation layer 60 covering the third patterned area PA3 allow the outer case 103 to maintain an excellent bending characteristic thereof without damage caused by the repeated bending of the outer case 103. Therefore, even when the first to third patterned areas PA1, PA2, and PA3 and the stress relaxation layer 60 are positioned only in an area corresponding to the area where the outer case 103 is bent, the bending characteristic may be sufficiently improved. In this case, since the production cost can be reduced, the productivity can be improved.

Next, a configuration of a flexible rechargeable battery according to an embodiment of the present disclosure will be described.

Figure 6:
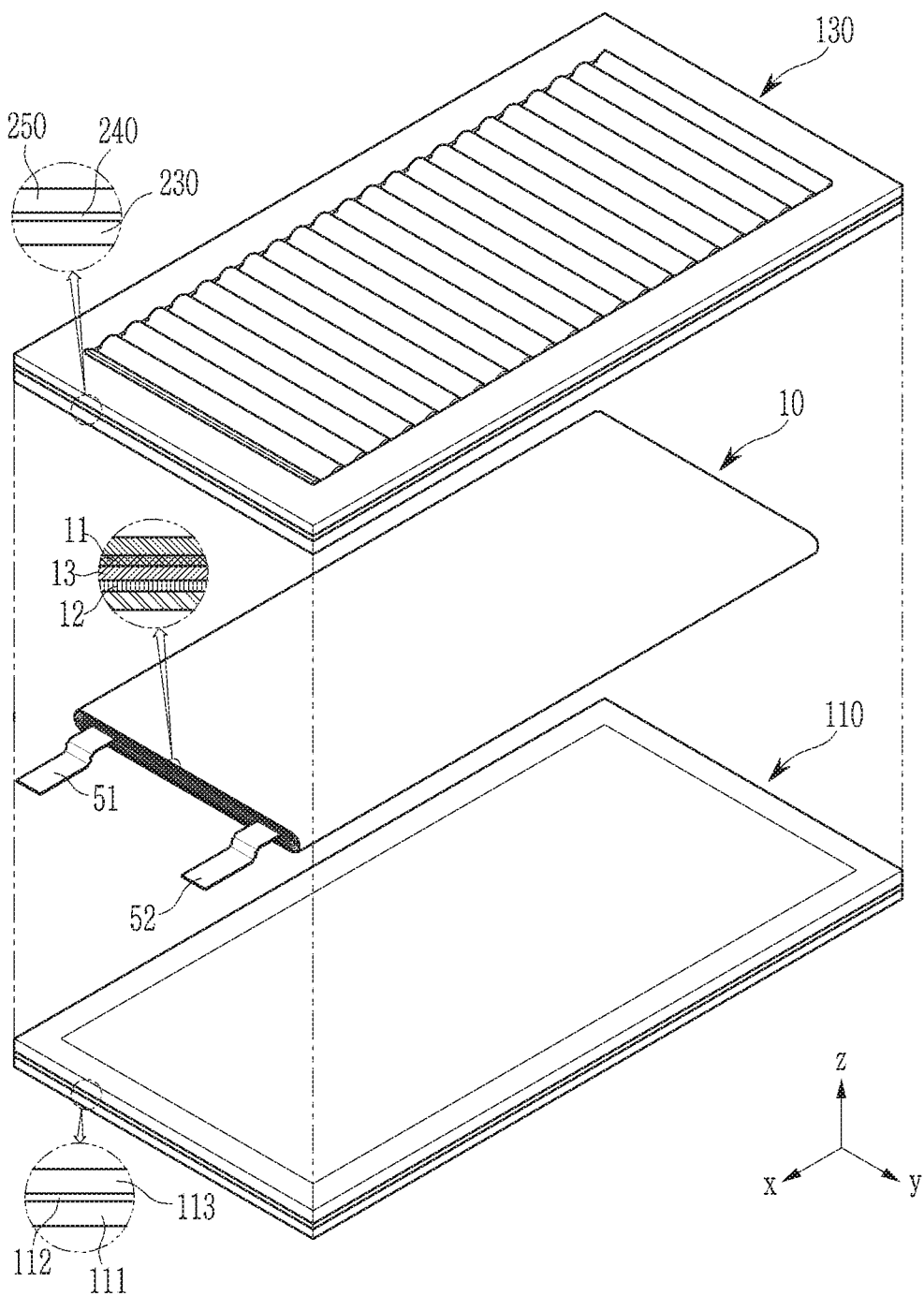
FIG. 6 illustrates a perspective view of a flexible rechargeable battery according to an exemplary embodiment of the present disclosure.
Figure 7:
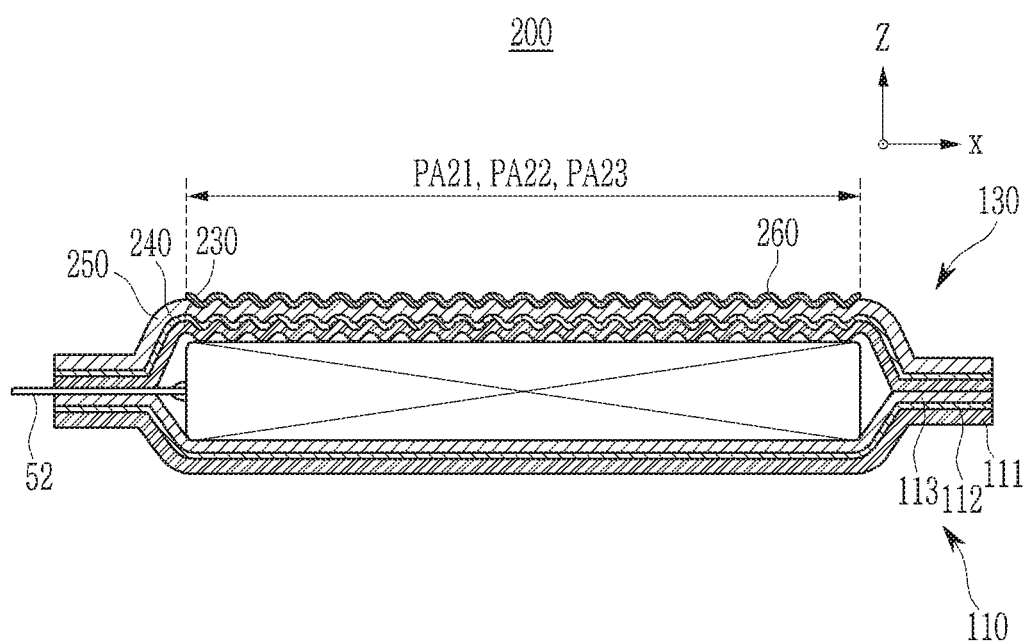
FIG. 7 illustrates a cross-sectional view of an xz plane of the flexible rechargeable battery of FIG. 6.

FIG. 6 illustrates a schematic perspective view of a flexible rechargeable battery 200 according to an exemplary embodiment of the present disclosure, and FIG. 7 illustrates a cross-sectional view of the flexible rechargeable battery of FIG. 6.

Referring to FIG. 6 and FIG. 7, the flexible rechargeable battery 200 according to the exemplary embodiment of the present disclosure includes an electrode assembly 10, a first outer case 130 configured to include an accommodating portion for accommodating the electrode assembly 10, and a second outer case 110 configured to accommodate the electrode assembly 10 and disposed to face the first outer case 130.

In this case, the first outer case 130 may be the outer case for a flexible rechargeable battery according to the above embodiments. That is, the outer case including a first resin layer 230 including a first patterned area PA21, a moisture barrier layer 240 including a second patterned area PA22, and a second resin layer 250 including a third patterned area PA23 is applied as the first outer case 130. In this case, if necessary, an accommodation portion for accommodating an assembly 10 may be formed in the above-described outer case for a flexible rechargeable battery by using, e.g., forming or the like.

FIG. 6 and FIG. 7 exemplarily illustrate a case of applying the outer case described with reference to FIG. 1 and FIG. 2 among the outer cases for the flexible rechargeable battery according to the above-described exemplary embodiments for convenience.

On the other hand, a pouch-type outer case for a rechargeable battery that is commonly used in the art may be used as the second outer case 110. For example, the second outer case 110 may have a structure in which a metal sheet 112 is disposed between a polymer sheet 113 and a nylon sheet 111.

As illustrated in FIG. 6, the electrode assembly 10 may be formed in a flattened structure by winding a separator 13 between a positive electrode 11 and a negative electrode 12, which have a strip shape and winding them. Alternatively, although not illustrated, a plurality of positive electrodes and negative electrodes having a rectangular sheet shape may be alternately stacked with separators interposed therebetween. In addition, the electrode assembly 10 includes a positive electrode terminal 51 and a negative electrode terminal 52 electrically connected to the positive electrode 11 and the negative electrode 12, respectively.

A flexible rechargeable battery 200 according to the present exemplary embodiment may be implemented by sealing edges of the first outer case 130 and the second outer case 110 after positioning first outer case 130 on a first surface of the electrode assembly 10 and positioning the second outer case 110 to face the first outer case 130.

The first outer cast 130 and the second outer cast 110 have a wider horizontal cross-sectional area (area of the xy plane) than the electrode assembly 10. In addition, the first to third patterned areas and a stress relaxation layer 260 may be formed only in an area overlapping the first surface (a surface parallel to the xy plane) of the electrode assembly 10, in the first outer case 130 to which the outer case according to the exemplary embodiment described above is applied.

Herein, the first outer case 130 may be disposed such that the first resin layer 230 contacts the first surface (the surface parallel to the xy plane) of the electrode assembly 10. That is, in the configuration of the first outer case 130, the stress relaxation layer 260 is disposed at an outermost portion of the flexible rechargeable battery 200.

As described above, the rechargeable battery 200 according to the present disclosure includes a first resin layer 230, a moisture barrier layer 240, and a second resin layer 250, which include first to third patterned regions, respectively, and uses the outer case including the stress relaxation layer 260 covering the third patterned area of the second resin layer 250 as the first outer case 130, and thus it is possible to implement the flexible rechargeable battery 200 having excellent bending characteristic and battery performance.

Figure 8:
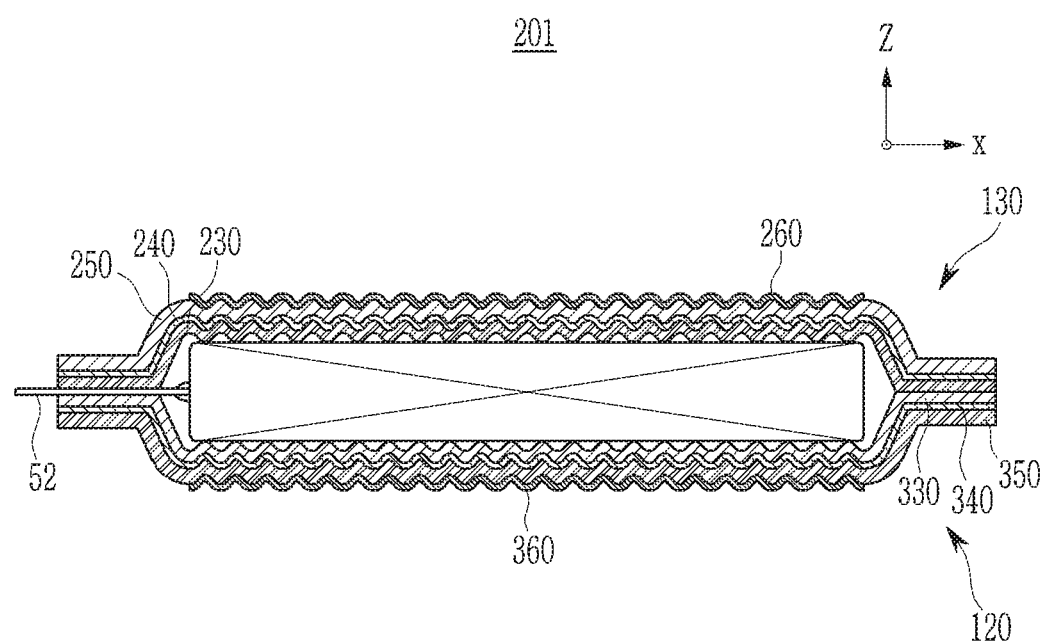
FIG. 8 illustrates a cross-sectional view of a flexible rechargeable battery according to another exemplary embodiment of the present disclosure.

FIG. 8 illustrates a cross-sectional view of a flexible rechargeable battery 201 according to another embodiment of the present disclosure. In describing a flexible rechargeable battery 201 according to the present exemplary embodiment, a detailed description of the same configuration as that of the flexible rechargeable battery 200 according to FIG. 6 and FIG. 7 will be omitted.

Referring to FIG. 8, in the present exemplary embodiment, a first outer case 130 and a second outer case 120 may be the outer cases for the flexible rechargeable battery according to the above-described embodiments.

That is, the outer case including a first resin layer 230 including a first patterned area, a moisture barrier layer 240 including a second patterned area, a second resin layer 250 including a third patterned area, and a stress relaxation layer 260 covering the third patterned area is applied as the first outer case 130.

In addition, the outer case including a first resin layer 330 including a first patterned area, a moisture barrier layer 340 including a second patterned area, a second resin layer 350 including a third patterned area, and a stress relaxation layer 360 covering the third patterned area is applied as the second outer case 120.

FIG. 8 exemplarily illustrates a case of applying the outer case described with reference to FIG. 1 and FIG. 2 among the outer cases for the flexible rechargeable battery according to the above-described exemplary embodiments as the first outer case 130 and the second outer case 120 for convenience. However, it is a matter of course that the outer case for a flexible rechargeable battery according to another exemplary embodiment may be applied as the first outer case 130 and/or the second outer case 120.

The first outer cast 130 and the second outer cast 120 have a wider horizontal cross-sectional area (area of the xy plane) than the electrode assembly 10.

The first to third patterned areas and the stress relaxation layer 260 in the first outer case 130 and the first to third patterned areas and the stress relaxation layer 360 in the second outer case 120 may be formed only in an area overlapping the electrode assembly 10. In addition, the stress relaxation layer 260 of the first outer case 130 may be in contact with the first surface (parallel to the xy plane) of the electrode assembly 10, and the stress relaxation layer 360 of the second outer case 120 may be disposed to contact the second surface facing the first surface of the electrode assembly 10.

As described above, the flexible rechargeable battery 201 according to the present disclosure uses outer cases including the first to third patterned areas including a plurality of patterns and the stress relaxation layers 260 and 360 covering the third patterned areas as the first outer case 130 and the second outer case 120, and thus it is possible to implement the flexible rechargeable battery 200 having an excellent bending characteristic and battery performance.

Hereinafter, exemplary embodiments of the present invention will be described in more detail.

Example 1

An electrode assembly was manufactured by spiral-winding a positive electrode and a negative electrode with a separator interposed therebetween in a direction and then pressing it.

Next, a polypropylene film, an aluminum thin plate, and a nylon film were sequentially stacked, to manufacture a pair of film stacks. Thereafter, a wavy pattern was formed in a region corresponding to the electrode assembly in each of the film stacks.

Next, the pair of film stacks were disposed such that surfaces on which the polypropylene film was stacked faced each other, the electrode assembly was disposed therebetween, and then edges of the film stacks facing each other were sealed.

Subsequently, a silicon-based resin composition was applied to cover the wavy patterns of the nylon film layers of the film stacks to form a stress relaxation layer having a thickness of 3 µm, thereby manufacturing a flexible rechargeable battery.

Comparative Example 1

An electrode assembly was manufactured by spiral-winding a positive electrode and a negative electrode with a separator interposed therebetween in a direction and then pressing it.

Next, a polypropylene film, an aluminum thin plate, and a nylon film were sequentially stacked, to manufacture a pair of film stacks.

Subsequently, the pair of film stacks were disposed such that surfaces on which the polypropylene film was stacked faced each other, the electrode assembly was disposed therebetween, and then edges of the film stacks facing each other were sealed, thereby manufacturing a flexible rechargeable battery.

Experimental Example—Battery Performance Test

For the rechargeable batteries according to Example 1 and Comparative Example 1, performance of the rechargeable batteries before and after the bending test was measured.

The performance of the rechargeable batteries was shown by charging and discharging at 0.2C, and then measuring the charge capacity and the discharge capacity thereof.

Figure 9:
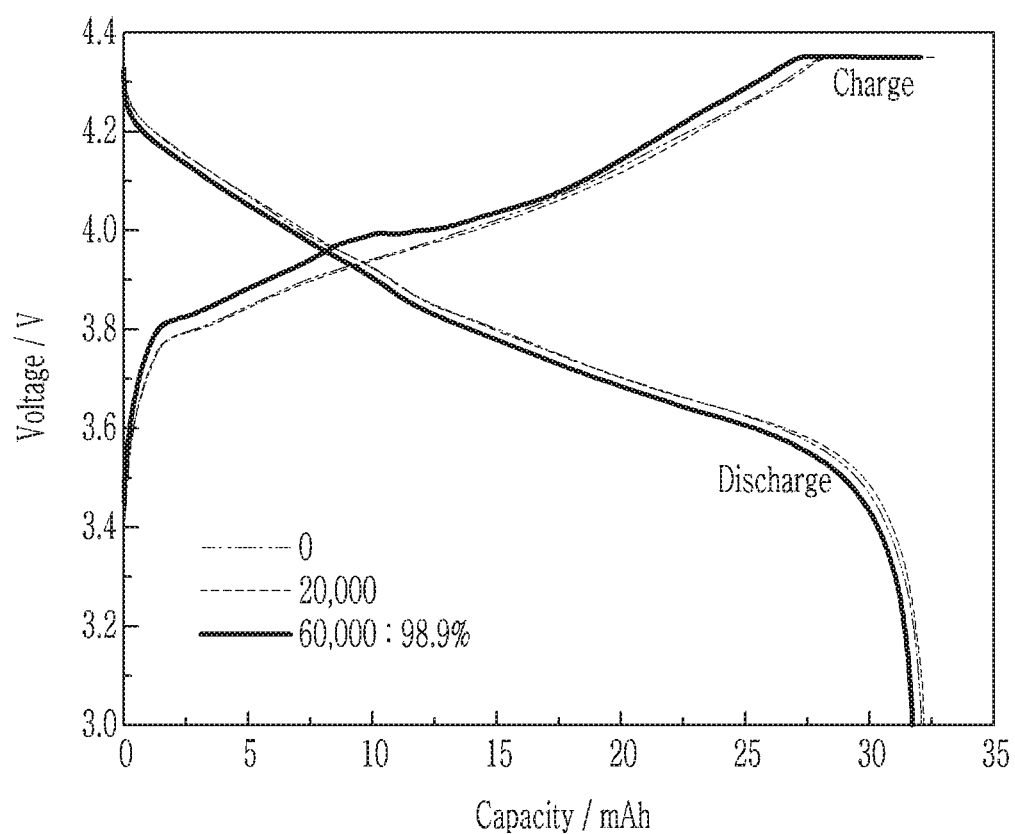
FIG. 9 illustrates measurement results of performance of a rechargeable battery before and after a bending test according to Example 1.
Figure 10:
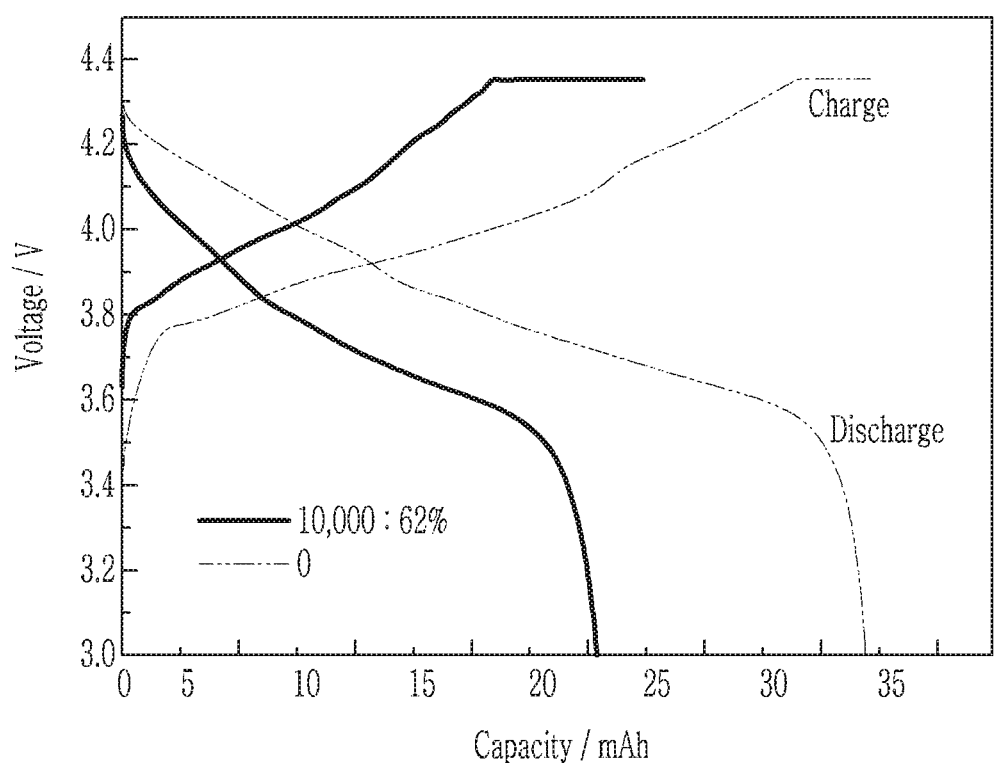
FIG. 10 illustrates measurement results of performance of a rechargeable battery before and after a bending test according to Comparative Example 1.

FIG. 9 illustrates measurement results of performance of a rechargeable battery before and after a bending test according to Example 1, and FIG. 10 illustrates measurement results of performance of a rechargeable battery before and after a bending test according to Comparative Example 1.

Referring to FIG. 9, it can be seen that the rechargeable battery according to Example 1 has almost the same charge and discharge capacity in both cases of before the bending test and after 20,000 times and 60,0000 times of the bending test.

However, referring to FIG. 10, it can be seen that the rechargeable battery according to comparative Example 1 reduces the charge and discharge capacity by about 62% in both cases of before the bending test and after 10,000 times of the bending test.

Therefore, as in an exemplary embodiment of the present disclosure, when at least one of the pair of outer cases respectively forms the first to third patterned area in the first resin layer, the moisture barrier layer, and the second resin layer and includes the stress relaxation layer covering the third patterned area, it can be seen that the bending characteristic of the rechargeable battery is remarkably improved, and accordingly, the durability of the flexible rechargeable battery can be greatly improved as compared to the case where there is no stress relaxation layer.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS 30, 230, 330: first resin layer
40, 240, 340: moisture barrier layer
50, 250, 350: second resin layer
PA1, PA21: first patterned area
PA2, PA22: second patterned area
PA3, PA23: third patterned area
60, 260, 360: stress relaxation layer
100, 101, 102, 103: outer case for flexible rechargeable battery
200, 201: flexible rechargeable battery
10: electrode assembly

The invention claimed is:

1. An outer case for a flexible rechargeable battery, comprising:
   a first resin layer configured to include a first patterned area and a first flat area outside the first patterned area;
   a moisture barrier layer disposed on the first resin layer to include a second patterned area and a second flat area outside the second patterned area;
   a second resin layer disposed on the moisture barrier layer to include a third patterned area and a third flat area outside the third patterned area; and
   a stress relaxation layer configured to cover the third patterned area,
   wherein the first flat area, the second flat area, and the third flat area overlap each other.

2. The outer case of claim 1, wherein
each of the first patterned area, the second patterned area, and the third patterned area includes a plurality of patterns disposed along a direction.

3. The outer case of claim 2, wherein
the plurality of patterns include a concave portion and a convex portion.

4. The outer case of claim 2, wherein
vertical cross-sections of the patterns have one or more of a triangular shape, a rectangular shape, a polygonal shape, a semicircular shape, a semi-elliptical shape, a wave shape, and a mixture thereof.

5. The outer case of claim 1, wherein
the stress relaxation layer is made of a silicone-based resin or a urethane-based resin.

6. The outer case of claim 1, wherein
the average thickness of the stress relaxation layer is in a range of 1 μm to 30 μm.

7. The outer case of claim 1, wherein
the first patterned area, the second patterned area, and the third patterned area are positioned to correspond to each other.

8. The outer case of claim 1, wherein
the first resin layer includes a plurality of first patterned areas,
the moisture barrier layer includes a plurality of second patterned areas, and
the second resin layer includes a plurality of third patterned areas.

9. The outer case of claim 1, wherein
the stress relaxation layer has a same vertical cross-sectional shape as that of the patterns formed in the third patterned area.

10. The outer case of claim 1, wherein
a first surface of the stress relaxation layer faces a second surface thereof,
the second surface of the stress relaxation layer includes a fourth patterned area contacting the third patterned area, and
the first surface of the stress relaxation layer is a flat surface.

11. The outer case of claim 1, wherein
the outer case is flexible.

12. The outer case of claim 11, wherein
the outer case includes a bending area and a non-bending area, and
the first patterned area, the second patterned area, and the third patterned area are positioned to correspond to the bending area.

13. A flexible rechargeable battery comprising:
an electrode assembly in which a stack including a positive electrode, a negative electrode, and a separator interposed therebetween is spiral-wound in a direction;
a first outer case configured to accommodate the electrode assembly therein; and
a second outer case disposed to face the first outer case and to accommodate the electrode assembly; and
the first outer case is the outer case for a flexible rechargeable battery according to claim 1.

14. The flexible rechargeable battery of claim 13, wherein the first resin layer of the first outer case contacts a first surface of the electrode assembly.

15. The flexible rechargeable battery of claim 14, wherein the second outer case is the outer case for a flexible rechargeable battery according to claim 1.

16. The flexible rechargeable battery of claim 15, wherein the first resin layer of the second outer case contacts a second surface of the electrode assembly that faces the first surface thereof.

17. An outer case for a flexible rechargeable battery, comprising:
a first resin layer configured to include a patterned area and a flat area;
a moisture barrier layer disposed on the first resin layer to include a patterned area and a flat area; and
a stress relaxation layer configured to cover the patterned area of the moisture barrier layer,
wherein the flat area of the first resin layer and the flat area of the moisture barrier layer overlap each other.

18. The outer case of claim 17, wherein each of a patterned area of the first resin layer and a patterned area of the moisture barrier layer includes a plurality of patterns disposed along a direction.

19. The outer case of claim 18, wherein the plurality of patterns include a concave portion and a convex portion.

20. The outer case of claim 18, wherein vertical cross-sections of the patterns have one or more of a triangular shape, a rectangular shape, a polygonal shape, a semicircular shape, a semi-elliptical shape, a wave shape, and a mixture thereof.

21. The outer case of claim 17, wherein the stress relaxation layer is made of a silicone-based resin or a urethane-based resin.

22. The outer case of claim 17, wherein the patterned area of the first resin layer and the patterned area of the moisture barrier layer are positioned to correspond to each other.

23. The outer case of claim 17, wherein the first resin layer includes a plurality of patterned areas, and
the moisture barrier layer includes a plurality of patterned areas.

24. The outer case of claim 17, wherein the stress relaxation layer has a same vertical cross-sectional shape as the patterns formed in the patterned area of the first resin layer or the patterned area of the moisture barrier layer.

25. The outer case of claim 1, wherein a first surface of the stress relaxation layer that faces a second surface thereof,
the second surface of the stress relaxation layer includes a patterned area facing the moisture barrier layer,
the first surface of the stress relaxation layer is a flat surface.

26. A flexible rechargeable battery comprising:
an electrode assembly in which a stack including a positive electrode, a negative electrode, and a separator interposed therebetween is spiral-wound in a direction;
a first outer case configured to accommodate the electrode assembly therein; and
a second outer case disposed to face the first outer case and to accommodate the electrode assembly,
wherein the first outer case is the outer case for a flexible rechargeable battery according to claim 17.

27. The flexible rechargeable battery of claim 26, wherein the second outer case is the outer case for a flexible rechargeable battery according to claim 17.

* * * * *